United States Patent Office 2,801,267
Patented July 30, 1957

2,801,267

PRODUCTION OF VINYL SULFONES

Donald M. Young, Charleston, and Edward M. La Combe, South Charleston, W. Va., assignors to Union Carbide Corporation, a corporation of New York No Drawing. Application April 27, 1955, Serial No. 504,363

6 Claims. (Cl. 260—607)

This invention relates to a novel process for the production of vinyl sulfones; and more especially it concerns their production by a relatively mild pyrolysis of 2-acyloxyethyl sulfones in the presence of a strongly basic catalyst.

Vinyl sulfones are extremely reactive compounds having value as vinyl monomers in a wide variety of polymerizations, and as intermediates for the production of a wide variety of compounds containing sulfonyl groups. The vinyl sulfones contribute high softening points to their homopolymers and to copolymers containing them.

Many attempts have been made to synthesize the vinyl sulfones, most of which have been objectionable because of the formation of toxic intermediates or have used reactants that are potenially explosive.

One process involves the pyrolysis of 2-acetoxyethyl sulfones in the vapor phase under high vacuum at temperatures around 150°–200° C. in the presence of a large excess of a solid contact catalyst such as aluminum oxide, silica, aluminum, graphite, titania, etc., or at temperatures around 400° C. to 600° C. in the presence of a large volume of an inert solid contact mass such as glass beads. Such a process involves serious problems in maintaining a uniform temperature in the reaction vessel and the avoidance of hot spots and local cracking of the highly reactive compounds present.

The present invention is based in important part upon our discovery that excellent yields of vinyl sulfones can be produced by the pyrolysis of 2-acyloxyethyl sulfones under relatively mild conditions, in the liquid phase, in the presence as catalyst of a strongly basic compound that is partially miscible with the sulfone starting material at operational temperatures.

In the practice of the novel process of the invention a 2-acyloxyethyl sulfone having a structure designated by the formula

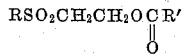

wherein R represents a radical of the class consisting of the alkyl groups having 1 to 20 carbon atoms, and the phenyl, benzyl, tolyl, and the

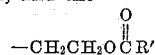

radicals; and R' represents a radical of the class consisting of the alkyl radicals having 1 to 20 carbon atoms, and the phenyl and benzyl and tolyl radicals, is heated to elevated temperatures in the range from around 140° C. to around 200° C. or higher, and preferably from around 160° C. to around 175° C., in the presence of a strongly basic catalyst, such as the alkali metal salts of alkanoic and alkanedioic acids, benzoic acid, phthalic acid and terephthalic acid; the alkali metal oxides, hydroxides, alkoxides, aryloxides, carbonates, bicarbonates, borates, silicates, phosphates and sulfites; and the benzyl trialkyl ammonium hydroxides. Among compounds of this useful class of catalysts for the process may be mentioned the sodium, potassium and lithium oxides, hydroxides, methoxides, ethoxides, phenoxides, acetates, propionates, caprylates, laurates, stearates, benzoates, phthalates, succinates, adipates, sebacates, carbonates, bicarbonates, tetraborates, silicates, phosphates and sulfites, and the benzyltrimethyl- and benzyltriethyl ammonium hydroxides. Also useful are the alkali metal salts of the 2-acyloxyethyl sulfone used as starting material. Such salts may be prepared by reaction of the starting material with the appropriate amount of an alkali metal hydroxide or alkoxide. Particularly effective as catalysts in the process are those basic alkali metal salts of organic and inorganic acids which acids when monobasic have a dissociation constant less than about $2 \times 10^{-2}$ at 25° C., and when polybasic have a first dissociation constant less than about $2 \times 10^{-2}$ at 25° C.

Among sulfones useful as starting materials in the process may be mentioned the formate, acetate, propionate, butyrate and benzoate esters of the following sulfonylethanols;

2-(phenylsulfonyl)ethanol,
2-(methylsulfonyl)ethanol,
2-(ethylsulfonyl)ethanol,
2-(isopropylsulfonyl)ethanol,
2-(butylsulfonyl)ethanol,
2-(2-ethylhexylsulfonyl)ethanol,
2-(decylsulfonyl)ethanol,
2-(benzylsulfonyl)ethanol,
2-(p-tolylsulfonyl)ethanol;

and the corresponding diformate, diacetate, dipropionate, dibutyrate and dibenzoate esters of bis-(2-hydroxyethyl) sulfone.

The reaction involved in one form of the process is illustrated by the equation:

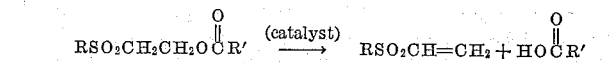

wherein R and R' have the meanings indicated herein. When a diester of a bis-(2-hydroxyethyl)sulfone is used as starting material, the principal reaction proceeds according to the equation:

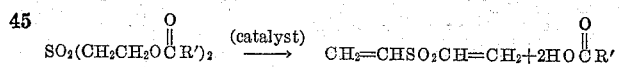

Generally the catalyst is intimately mixed with the sulfone starting material in a concentration of from about 0.1% to about 2%, based upon the weight of the said starting material; although larger amounts can be used effectively.

Commonly the mixture of the 2-acyloxyethyl sulfone and the catalyst are intermixed in a reaction vessel connected with a distilling head, a condenser and a receiver, the latter of which is operatively connected with a source of high vacuum. Means are provided for flushing the system with an inert gas such as nitrogen prior to and during the pyrolysis. The reactant-catalyst mixture can be heated to the desired reaction temperature either before or after being introduced into the reaction vessel.

The acid R'COOH formed during the reaction is removed as it is formed, the temperature and pressure employed in the reaction preferably being such that the vinyl sulfone concurrently formed remains in major part as a distillation residue. The latter then is distilled under high vacuum to recover a purified distilled vinyl sulfone.

If desired the sulfone starting material, preheated or unheated, can be introduced continuously in small successive amounts into the reaction vessel containing all or a selected portion of the catalyst, and the products of the reaction removed continuously.

The following examples serve to illustrate the invention.

EXAMPLE 1

The acetate ester of 2-(phenylsulfonyl)ethanol (157 grams, 0.69 mol) and 3 grams of sodium acetate were mixed in a 250-ml. glass flask connected with a source of vacuum through a short, unpacked Claisen-type distilling head provided with a condenser. The pressure was reduced to 50 mm. of mercury while the flask was heated to 175° C. whereupon pyrolysis occurred and acetic acid distilled over at a head temperature ranging from 47° C. to 60° C. The acetic acid condensed and recovered contained 36.3 grams of acetic acid (78% of theory). The reaction flask then was cooled to about 100° C. and the pressure was reduced to 1.5 mm. of mercury, whereupon the reaction vessel residue was distilled at 110°–120° C., yielding a clear water white distillate having $n_D^{30}$ of 1.5509 and corresponding to an 85% yield of the phenyl vinyl sulfone. It had a melting point of 68°–69° C., and crystallized instantly when seeded with an authentic sample of phenyl vinyl sulfone.

EXAMPLE 2

The acetate ester of 2-(methylsulfonyl)ethanol (1460 grams, 8.8 mols) and 14.6 grams of sodium acetate (1% by weight, based upon the starting material) were mixed in a two-liter flask equipped for vacuum distillation and connected with a distillation column coupled to a vacuum pump through a Dry Ice cold trap. The kettle temperature was raised to 170° C. and the pressure in the still was reduced to 100 mm. of mercury whereupon acetic acid distilled continuously over a period of 4.5 hours yielding 501 grams of acetic acid (95% of the theoretical). The still residue was transferred to a Claisen-type still and distilled under high vacuum, yielding 707 grams (76% yield) of methyl vinyl sulfone having a boiling point of 102°–105° C. under 10 mm. of mercury pressure, and $n_D^{30}$ of 1.4578. The above methyl vinyl sulfone was carefully fractionated under vacuum to yield 639 grams having a boiling point of 88°–89° C. at 5 mm. of mercury, and $n_D^{30}$ of 1.4585.

In contrast with these results, a similar pyrolysis of 0.5 mol of the acetate ester of 2-(methylsulfonyl)ethanol, in the absence of any catalyst by heating to a kettle temperature of 235° C. under a pressure of 100 mm. of mercury during 1.25 hours showed no decomposition, and yielded no detectable amount of distillate.

Furthermore, a similar run wherein 0.5 mol of the acetate ester of 2-(methylsulfonyl)ethanol and 2% of F–20 "Alcoa" alumina, based upon the weight of the said acetate ester, after being heated at temperatures of 175°–190° C. for 3.5 hours, and then further heated to 210°–215° C. for 30 minutes, yielded no detectable amount of distillate, indicating the absence of reaction.

EXAMPLE 3

Using apparatus of the type described in Example 2, a mixture of 135 grams (0.75 mol) of the propionate ester of 2-(methylsulfonyl)ethanol and 2.7 grams of sodium acetate (2% by weight, based upon the said propionate) was heated at temperatures within the range of 130° C. to 175° C. under the conditions set forth in Table I under pressures of from 5 to 100 mm. of mercury. Cuts Nos. 3, 4 and 5, respectively, contained 89.5%, 82.5% and 61%, respectively, of methyl vinyl sulfone. It was noted that when the kettle temperature was at 175° C. (cut 1) propionic acid was eliminated readily, and that when the pressure was decreased and the kettle temperature fell to 130° C. (cuts 3 and 4) only a small amount of propionic acid was distilled. A total yield of methyl vinyl sulfone of 59% of the theoretical was secured.

Table I

| Cut # | Pressure, mm. | Temperature, °C. Head | Temperature, °C. Kettle | Wt., g. | $n_D^{33}$ | Remarks |
|---|---|---|---|---|---|---|
| 1 | 50 | 68–70 | 175 | 15 | 1.3812 | Titrated 100% as propionic acid. |
| 2 | 50–10 | 42–50 | 130 | 18 | 1.3847 | Titrated 97% as propionic acid. |
| 3 | 5 | 85–90 | 130 | 16 | 1.4505 | Titrated 10.5% as propionic acid. |
| 4 | 5 | 90 | 130–150 | 9 | 1.4450 | Titrated 17.5% as propionic acid. |
| 5 | 100–5 | <90 | 175–130 | 19 | 1.4290 | Titrated 37% as propionic acid. |
|  |  | residue |  | 35 |  |  |

EXAMPLE 4

A one liter distilling flask attached to a distilling head was provided with an electric heating mantle, and the distillation apparatus was connected through a condenser, a cold trap held at −10° C. and a Dry Ice trap to a vacuum pump. 1.25 grams of sodium acetate catalyst was placed in the flask, and the pressure was reduced to 100 mm. of mercury. Thereafter during 180 minutes 498 grams of the acetate ester of 2-(methylsulfonyl)ethanol were added continuously after heating the reaction vessel to a kettle temperature of 175° C. A distillate consisting of methyl vinyl sulfone and acetic acid was removed continuously from the reaction vessel almost as rapidly as formed during addition of the sulfonyl compound. Finally the pressure in the vessel was reduced to 10 mm. of mercury to complete the distillation. Redistillation of the collected distillate gave a 77% yield of methyl vinyl sulfone.

EXAMPLE 5

Using the apparatus and following the procedure generally described in Example 2, 83 grams (0.5 mol) of the acetate ester of 2-(methylsulfonyl)ethanol and 0.83 grams of potassium hydroxide were mixed in the reaction vessel, the pressure thereon was reduced to 100 mm. of mercury and the kettle temperature was maintained at 160°–170° C. during 60 minutes, with the recovery as distillate of 19 grams of acetic acid ($n_D^{30}$=1.3710). Distillation of the residue yielded 33 grams (62% yield) of methyl vinyl sulfone, having a boiling point of 80°–83° C. at 3 mm. pressure; and $n_D^{30}$=1.4560.

EXAMPLE 6

Using apparatus of the general type described in Example 1, a mixture of 238 grams (1 mol) of the diacetate ester of 2,2'-sulfonyldiethanol and 4.76 grams of sodium acetate was heated to about 160° C. under 100 mm. of mercury pressure, and 96 grams of 97% acetic acid were collected. The pressure in the vessel then was reduced to 5 mm. of mercury at the said temperature, and there was obtained as distillate 92 grams of divinyl sulfone (a 72% yield) having a boiling point of 92° C. at 5 mm. pressure; and $n_D^{30}$=1.4720.

A small sample of this divinyl sulfone, containing several percent of benzoyl peroxide, polymerized in about 3 minutes when heated at 100° C.

EXAMPLE 7

Using apparatus of the general type described in Example 1, a mixture of 1000 grams (6 mols) of the acetate ester of 2-(methylsulfonyl)ethanol and 5 grams of sodium acetate (0.50% by weight, based upon the sulfonyl compound) was subjected to 100 mm. of mercury pressure and heated at a kettle temperature of 175° C. during six hours. 316 grams of acetic acid was collected as distillate.

Distillation of the residue under vacuum yielded 517 grams (81% yield) of methyl vinyl sulfone, having a boiling point of 68° C. at 2 mm., and a refractive index ($n_D^{30}$) of 1.4585.

EXAMPLE 8

Using apparatus of the general type described in Example 2, a mixture of 83 grams (0.5 mol) of the acetate ester of 2-(methylsulfonyl)ethanol and 4 grams of a 40% aqueous solution of benzyltrimethylammonium hydroxide were placed under 100 mm. of mercury pressure and held at 160°–170° C. during sixty minutes, yielding 13 grams of a distillate titrated as 81% acetic acid. Distillation of the residue under vacuum yielded 35 grams (66% yield) of methyl vinyl sulfone having a boiling point of 80°–83° C. at 3 mm.

EXAMPLES 9 TO 16

In each of these examples, using apparatus of the general type described in Example 2 and following that general procedure, a mixture of 55 grams (0.33 mol) of the acetate ester of 2-(methylsulfonyl)ethanol and 0.55 gram of one of the alkali metal compounds specified in Table II was reacted at the temperature designated, under a pressure of 100 mm. of mercury, the acetic acid by-product being removed and recovered, after which the methyl vinyl sulfone was recovered.

Table II

| Example | Salt | Dissociation Constant, K, of Corresponding Acid | Kettle Temp., °C. | Yield of vinyl sulfone, grams |
|---|---|---|---|---|
| 9 | Sodium methoxide | | 170 | b 35 |
| 10 | Sodium bicarbonate | 5.6×10⁻¹¹ | 175 | 20 |
| 11 | Sodium carbonate | 4.3×10⁻⁷ | 175 | 15 |
| 12 | Potassium salt of 2-methyl-sulfonylethyl acetate.ᵃ | | 170 | 19 |
| 13 | Sodium tetraborate | 5.8×10⁻¹⁰ | 175 | 18 |
| 14 | Sodium stearate | | 175 | 18 |
| 15 | Trisodium phosphate | 7.5×10⁻³ | 175 | 15 |
| 16 | Sodium sulfite | 1.72×10⁻² | 175–200 | 12 |

ᵃ 0.275 gram of catalyst was used.
ᵇ 83 grams of starting material was used.

The yields of vinyl sulfone were relatively low owing to the small amounts of materials used.

The invention is susceptible of modification within the scope of the appended claims.

We claim:

1. Process for preparing vinyl sulfones, which comprises pyrolyzing a 2-acyloxyethyl sulfone of the formula $$RSO_2CH_2CH_2O\underset{\underset{O}{\|}}{C}R'$$

wherein R represents a radical of the class consisting of the alkyl groups having 1 to 20 carbon atoms, the phenyl, benzyl, tolyl, and the $$-CH_2CH_2O\underset{\underset{O}{\|}}{C}R'$$

radicals; and R' represents a radical of the class consisting of the lower alkyl radicals and the phenyl, benzyl and tolyl radicals, at temperatures within the range between 140° C. and 200° C. in the presence of a strongly basic catalyst of the class consisting of the alkali metal salts of the following acids: the alkanoic and alkanedioic acids, benzoic acid, and the phthalic acids; the alkali metal oxides, hydroxides, lower alkoxides, phenoxides, carbonates, bicarbonates, borates, phosphates and sulfites; the alkali metal salts of said 2-acyloxyethyl sulfones; and the benzyl trialkylammonium hydroxides.

2. Process as defined in claim 1, wherein the said catalyst is an alkali metal acetate.

3. Process as defined in claim 1, wherein the said catalyst is an alkali metal hydroxide.

4. Process as defined in claim 1, wherein the said catalyst is a compound of the structure $$O=C\diagup^{OAlk}_{OR}$$

where Alk represents an alkali metal and R represents a member of the class consisting of hydrogen and the alkali metals.

5. Process as defined in claim 1, wherein the said catalyst is sodium tetraborate decahydrate (borax).

6. Process as defined in claim 1, wherein the said catalyst is trisodium phosphate.

References Cited in the file of this patent

UNITED STATES PATENTS

| 2,474,808 | Schoene | July 5, 1949 |
| 2,554,576 | Landau | May 29, 1951 |

FOREIGN PATENTS

| 842,198 | Germany | June 23, 1952 |